(12) United States Patent
Aso et al.

(10) Patent No.: US 12,428,051 B2
(45) Date of Patent: Sep. 30, 2025

(54) STEERING ASSIST DEVICE, STEERING ASSIST METHOD, AND VEHICLE

(71) Applicant: Isuzu Motors Limited, Yokohama (JP)

(72) Inventors: Mitsuhiro Aso, Fujisawa (JP); Yuuki Tenma, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 18/702,041

(22) PCT Filed: Nov. 2, 2022

(86) PCT No.: PCT/JP2022/040980
§ 371 (c)(1),
(2) Date: Apr. 17, 2024

(87) PCT Pub. No.: WO2023/080155
PCT Pub. Date: May 11, 2023

(65) Prior Publication Data
US 2025/0236331 A1   Jul. 24, 2025

(30) Foreign Application Priority Data
Nov. 4, 2021   (JP) .................................. 2021-180249

(51) Int. Cl.
*B62D 5/04*   (2006.01)

(52) U.S. Cl.
CPC ................................. *B62D 5/0463* (2013.01)

(58) Field of Classification Search
CPC ...................................................... B62D 5/0463
See application file for complete search history.

(56) References Cited

U.S. PATENT DOCUMENTS

2016/0362102 A1*  12/2016  Honda ................ B60W 30/045

FOREIGN PATENT DOCUMENTS

| JP | 2005-160262 | 6/2005 |
| JP | 2005-247276 | 9/2005 |
| JP | 2006-187047 | 7/2006 |
| JP | 2014-023199 | 2/2014 |
| WO | WO 2016/133182 | 8/2016 |

* cited by examiner

*Primary Examiner* — Xiao En Mo

(57) ABSTRACT

This steering assist device including: a detection unit that detects the steering angle of the steering wheel; and an assist unit that varies the driving torque on the basis of an assist torque, wherein while the steering angle is increasing, the assist unit decreases, by an amount equal to the assist torque, the driving torque of a first motor that drives the steering wheel on the inside of a turn by the vehicle, and increases, by an amount equal to the assist torque, the driving torque of a second motor that drives the steering wheel on the outside of a turn by the vehicle.

5 Claims, 6 Drawing Sheets

STEERING ASSIST DEVICE, STEERING ASSIST METHOD, AND VEHICLE

TECHNICAL FIELD

The present disclosure relates to a steering assist apparatus, a steering assist method, and a vehicle.

BACKGROUND ART

In recent years, in-wheel-motor vehicles that can drive a plurality of wheels independently (for example, PTL 1) have been developed, and, in the in-wheel-motor vehicles, an in-wheel motor is provided for each driving wheel.

CITATION LIST

Patent Literature

PTL 1
Japanese Patent Application Laid-Open No. 2014-23199

SUMMARY OF INVENTION

Technical Problem

In many in-wheel-motor vehicles, since an in-wheel motor is disposed inside of a driving wheel, a knuckle, which is a component that holds a wheel and through which the rotation axis of the wheel when steered extends, is disposed at a position separated from the wheel. In this case, a kingpin offset, which is the distance between a point where the rotation axis intersects the ground and the center of the contact patch of the wheel, tends to be generated. As the kingpin offset increases, a force necessary for steering the vehicle increases, and a driver feels that the steering wheel is heavy.

In a general vehicle, the caster angle is set to have a certain degree of magnitude (for example, about 2 degrees) in order to increase the straight-line stability of the vehicle. However, as the caster angle increases, a force necessary for steering the vehicle increases.

Accordingly, in a vehicle having a kingpin offset, when the caster angle is set to an angle approximately the same as that of a general vehicle, a force necessary for steering the vehicle further increases. On the other hand, when the caster angle is made closer to 0 degrees, the straight-line stability of the vehicle decreases, although it is possible to decrease the force necessary for steering to a certain degree.

An object of the present disclosure is to provide a steering assist apparatus, a steering assist method, and a vehicle each of which decreases a force necessary for steering while maintaining the straight-line stability of a vehicle.

Solution to Problem

One aspect of a steering assist apparatus according to the present disclosure is an apparatus for assisting in steering of a vehicle having a kingpin offset, the apparatus including: a detection section that detects a steering angle of a steering wheel; and an assist section that changes a travel torque based on an assist torque that, when the steering angle is greater than or equal to a threshold, increases as the steering angle increases, and that, when the steering angle is less than the threshold, has a value less than or equal to a minimum value when the steering angle is greater than or equal to the threshold, in which, while the steering angle is increasing, the assist section decreases the travel torque of a first motor that drives an inner steerable wheel of the vehicle during a turn by an amount of the assist torque, and increases the travel torque of a second motor that drives an outer steerable wheel of the vehicle during a turn by the amount of the assist torque.

One aspect of a steering assist method according to the present disclosure is a method for assisting in steering of a vehicle having a kingpin offset, the method including: detecting a steering angle of a steering wheel; and while the steering angle is increasing, based on an assist torque, decreasing a travel torque of a first motor that drives an inner steerable wheel of the vehicle during a turn by an amount of the assist torque and increasing a travel torque of a second motor that drives an outer steerable wheel of the vehicle during a turn by the amount of the assist torque, the assist torque being an assist torque that, when the steering angle is greater than or equal to a threshold, increases as the steering angle increases, and that, when the steering angle is less than the threshold, has a value less than or equal to a minimum value when the steering angle is greater than or equal to the threshold.

One aspect of a vehicle according to the present disclosure includes the steering assist apparatus described above.

Advantageous Effects of Invention

With the present disclosure, it is possible to provide a steering assist apparatus that decreases a force necessary for steering while maintaining the straight-line stability of a vehicle.

DESCRIPTION OF EMBODIMENTS

Embodiment

Hereafter, an embodiment of the present disclosure will be described with reference to the drawings.

Figure 1:
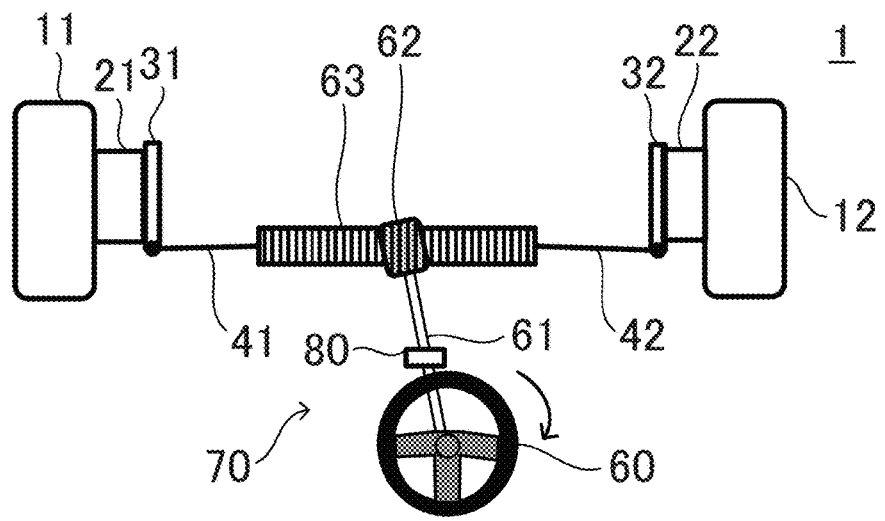
FIG. 1 is a schematic view of a vehicle according to an embodiment.
Figure 2:
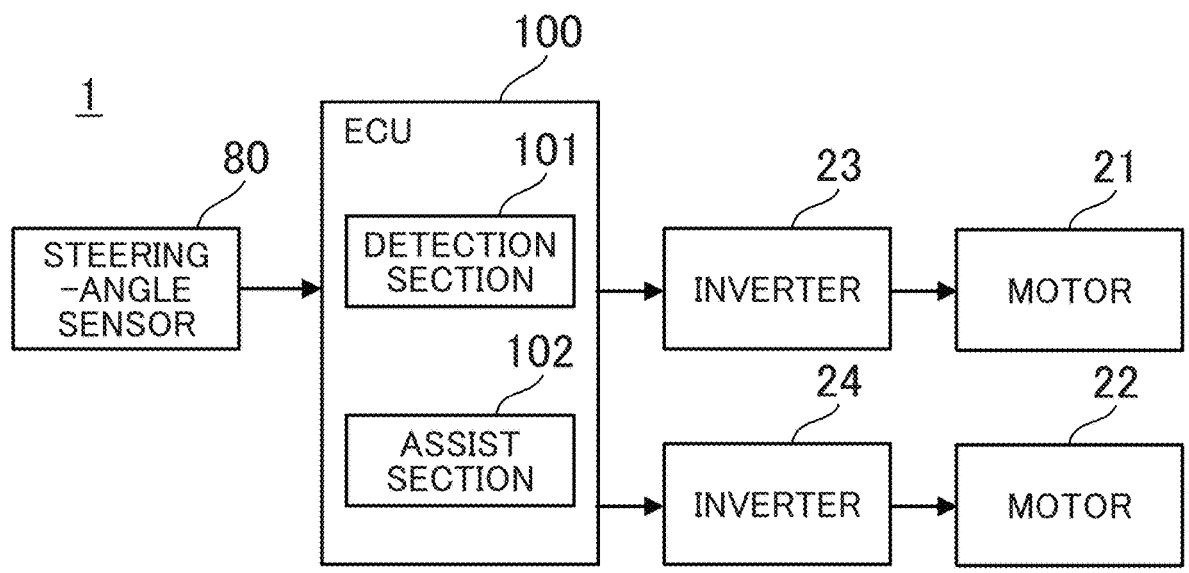
FIG. 2 is a block diagram illustrating the functional configuration of the vehicle according to the embodiment.

First, referring to FIGS. 1 and 2, the configuration of vehicle 1 including a steering assist apparatus according to the present embodiment will be described. FIG. 1 is a schematic view of vehicle 1 according to the present embodiment. FIG. 2 is a block diagram illustrating the functional configuration of vehicle 1 according to the present embodiment. Vehicle 1 according to the present embodiment is an in-wheel-motor vehicle in which left and right front wheels are steerable wheels.

Vehicle 1 includes a plurality of steerable wheels 11 and 12, a plurality of motors 21 and 22, a plurality of inverters 23 and 24 (see FIG. 2), a plurality of knuckles 31 and 32, steering apparatus 70, steering-angle sensor 80, and ECU (Electronic Control Unit) 100 (see FIG. 2).

Steerable wheels 11 and 12 are front wheels that are disposed on the left and right, and each rotate around a kingpin axis L1 (see FIG. 3), which is a rotation axis, when steered.

Motors 21 and 22 are in-wheel motors that are used for travel drive. Motors 21 and 22 are respectively inserted into the inside of steerable wheels 11 and 12 and generate travel torques in accordance with electric power from inverters 23 and 24 (see FIG. 2) to drive steerable wheels 11 and 12 independently. The travel torques are torques that motors 21 and 22 output to allow vehicle 1 to travel. In the present description, steerable wheels 11 and 12 may be respectively referred to as "left steerable wheel 11" and "right steerable wheel 12", and motors 21 and 22 may be respectively referred to as "left motor 21" and "right motor 22".

Inverters 23 and 24 (see FIG. 2) supply electric power to motors 21 and 22 under the control of ECU 100.

Knuckles 31 and 32 are components that hold steerable wheels 11 and 12 and are interposed between steerable wheels 11 and 12 and steering apparatus 70.

Tie rods 41 and 42 are components that couple knuckles 31 and 32 to steering apparatus 70.

Figure 3:
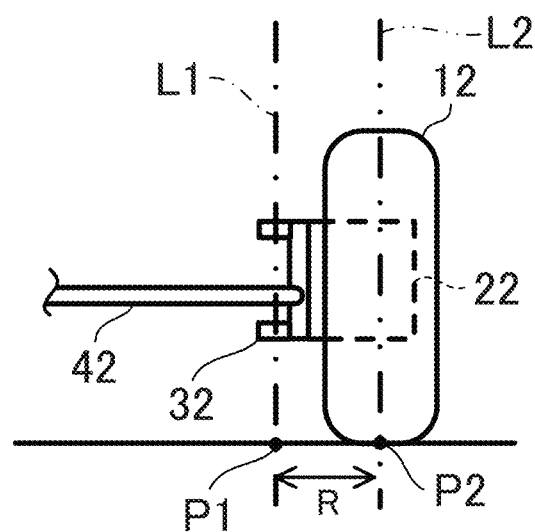
FIG. 3 is a schematic view illustrating the kingpin offset of the vehicle according to the embodiment.

Steering apparatus 70 is an apparatus that steers vehicle 1 by rotating steerable wheels 11 and 12 around the kingpin axes L1 (see FIG. 3). Steering apparatus 70 of FIG. 1 is a rack-and-pinion steering apparatus and includes steering wheel 60, steering shaft 61, pinion component 62, and rack shaft 63.

Steering wheel 60 is, for example, a steering wheel. A driver can input a steering instruction to steering apparatus 70 by rotating steering wheel 60.

Steering shaft 61 is a member whose one end is connected to steering wheel 60 and the other end is connected to pinion component 62.

Pinion component 62 is a component on which a pinion gear is formed.

A rack gear is formed on rack shaft 63, one end and the other end of rack shaft 63 are respectively connected to tie rods 41 and 42, and rack shaft 63 is disposed so that the rack gear meshes with the pinion gear of pinion component 62.

When a driver rotates steering wheel 60, steering shaft 61 and pinion component 62 rotate, and the rotational motion is converted into reciprocating motion of rack shaft 63 in the vehicle-width direction. The reciprocating motion is transmitted to knuckles 31 and 32 via tie rods 41 and 42, and thereby steerable wheels 11 and 12 rotate respectively around the left and right kingpin axes L1.

Steering-angle sensor 80 is disposed on steering shaft 61, detects the rotation angle of steering shaft 61, and outputs rotation angle information and rotation velocity information to ECU 100. In the present embodiment, since the rotation angle of steering shaft 61 is the same as the rotation angle of steering wheel 60, it can be said that steering-angle sensor 80 substantially detects the rotation angle of steering wheel 60.

In the following description, the rotation angle of steering wheel 60 may be simply referred to as "rotation angle", and the term "steering angle" may be used to mean the absolute value of rotation angle.

In the present description, the rotation angle of steering wheel 60 when vehicle 1 moves straightly is defined as 0 degrees, and the direction in which steering wheel 60 is rotated so that vehicle 1 turns right (see the arrow in FIG. 1) is defined as the positive direction. Thus, for example, the rotation angle is "+30 degrees" when steering wheel 60 is rotated by 30 degrees in the positive direction from a state in which the rotation angle is 0 degrees, and the rotation angle is "−30 degrees" when steering wheel 60 is rotated by 30 degrees in the negative direction.

ECU 100 performs overall control of vehicle 1. ECU 100 is a microprocessor that includes a CPU (Central Processing Unit), a ROM (Read Only Memory), a RAM (Random Access Memory), and the like.

In the present embodiment, ECU 100 functions as a steering assist apparatus. That is, ECU 100 functions as detection section 101 and assist section 102, as the CPU reads out a predetermined program stored in the ROM, loads the predetermined program into the RAM, and executes the loaded predetermined program.

Detection section 101 detects the rotation angle and the angular velocity of steering wheel 60 based on rotation angle information and rotation velocity information from steering-angle sensor 80.

Thus, detection section 101 can detect a rotational operation (hereafter, referred to as "steering operation") of steering wheel 60. The steering operation includes an operation of increasing the steering angle and an operation of decreasing the steering angle. The operation of increasing the steering angle is an operation of rotating steering wheel 60 so that the state of vehicle 1 changes from a state in which vehicle 1 is moving straightly (hereafter, may be referred to as "straightly-moving state") to a state in which vehicle 1 turns left or right (hereafter, may be referred to as "turning state"). The operation of decreasing the steering angle is an operation of rotating steering wheel 60 so that the state of vehicle 1 changes from the turning state to the straightly-moving state.

Assist section 102 outputs a control signal to inverters 23 and 24 based on a result of detection by detection section 101 and changes the travel torques of motors 21 and 22. Thus, assist section 102 assists in steering of vehicle 1. In addition to steering assist of vehicle 1, assist section 102 performs processing for promoting the straight-line stability of vehicle 1. Assist by assist section 102 and processing, other than assist, of promoting the straight-line stability will be described below in detail.

<Kingpin Offset>

Next, referring to FIG. 3, the kingpin offset of vehicle 1 will be described. FIG. 3 is a schematic view illustrating the kingpin offset R of vehicle 1 and illustrates the vicinity of steerable wheel 12 when vehicle 1 is seen from the back. In FIG. 3, P1 is a point where the kingpin axis L1 intersects the ground, P2 is the center of the contact patch of steerable wheel 12, and L2 is a perpendicular line that passes through the center P2 of the contact patch.

In a general vehicle, the kingpin axis L1 is inclined in the vehicle-width direction so that the kingpin offset R, which is the distance between the point P1 and the center P2 of the contact patch, is made closer to zero and a force necessary for rotating steering wheel 60 is decreased.

In the present embodiment, since motors 21 and 22 are disposed inside of steerable wheels 11 and 12, knuckles 31 and 32 are disposed outside of steerable wheels 11 and 12, to be specific, further toward the inside than motors 21 and 22 in the vehicle-width direction. As a result, knuckles 31 and 32 are disposed at positions separated from centers P2 of the contact patches of steerable wheels 11 and 12.

Since the left and right kingpin axes L1 respectively extend through knuckles 31 and 32, when it is attempted to make the kingpin offset R be zero in vehicle 1 in which knuckles 31 and 32 are separated from centers P2 of the contact patches, the inclination angle of the kingpin axes L1 in the vehicle-width direction (so-called, kingpin angle) becomes extremely large. As a result, inconvenience occurs in that a force necessary for steering contrarily increases when the steering angle of steering wheel 60 is large.

As illustrated in FIG. 3, in vehicle 1 according to the present embodiment, the kingpin axis L1 is perpendicular to the ground, that is, the kingpin angle is set to 0 degrees.

<Caster Angle>

Figures 4A, 4B:
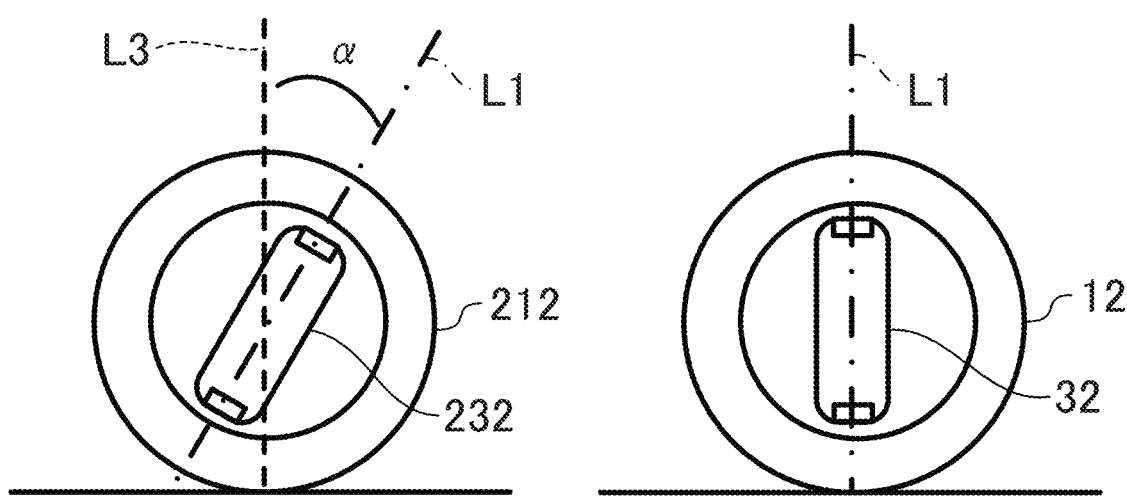
FIG. 4A is a schematic view illustrating the caster angle of a general vehicle.
FIG. 4B is a schematic view illustrating the caster angle of the vehicle according to the embodiment.

Next, referring to FIGS. 4A and 4B, the caster angle of vehicle 1 will be described. FIG. 4A is schematic view illustrating the caster angle α of a general vehicle, and FIG. 4B is schematic view illustrating the caster angle α of vehicle 1 according to the present embodiment. In FIG. 4A, L3 is a perpendicular line that is perpendicular to the ground, 212 is a steerable wheel of a general vehicle, and 232 is a knuckle of the general vehicle. FIGS. 4A and 4B both illustrate the vicinities of steerable wheel 212 and 12 when seen from the inside toward the outside in the vehicle-width direction.

In the general vehicle, in order to increase the straight-line stability, the caster angle α is set to be greater than 0 degrees (for example, approximately 2 degrees) (see FIG. 4A).

When the caster angle is set to be greater than 0 degrees, a force necessary for rotating steering wheel 60 increases. Therefore, vehicle 1 according to the present embodiment is set so that the caster angle becomes 0 degrees when unloaded (see FIG. 4B).

<Processing of Steering Assist Apparatus>

Figure 5:
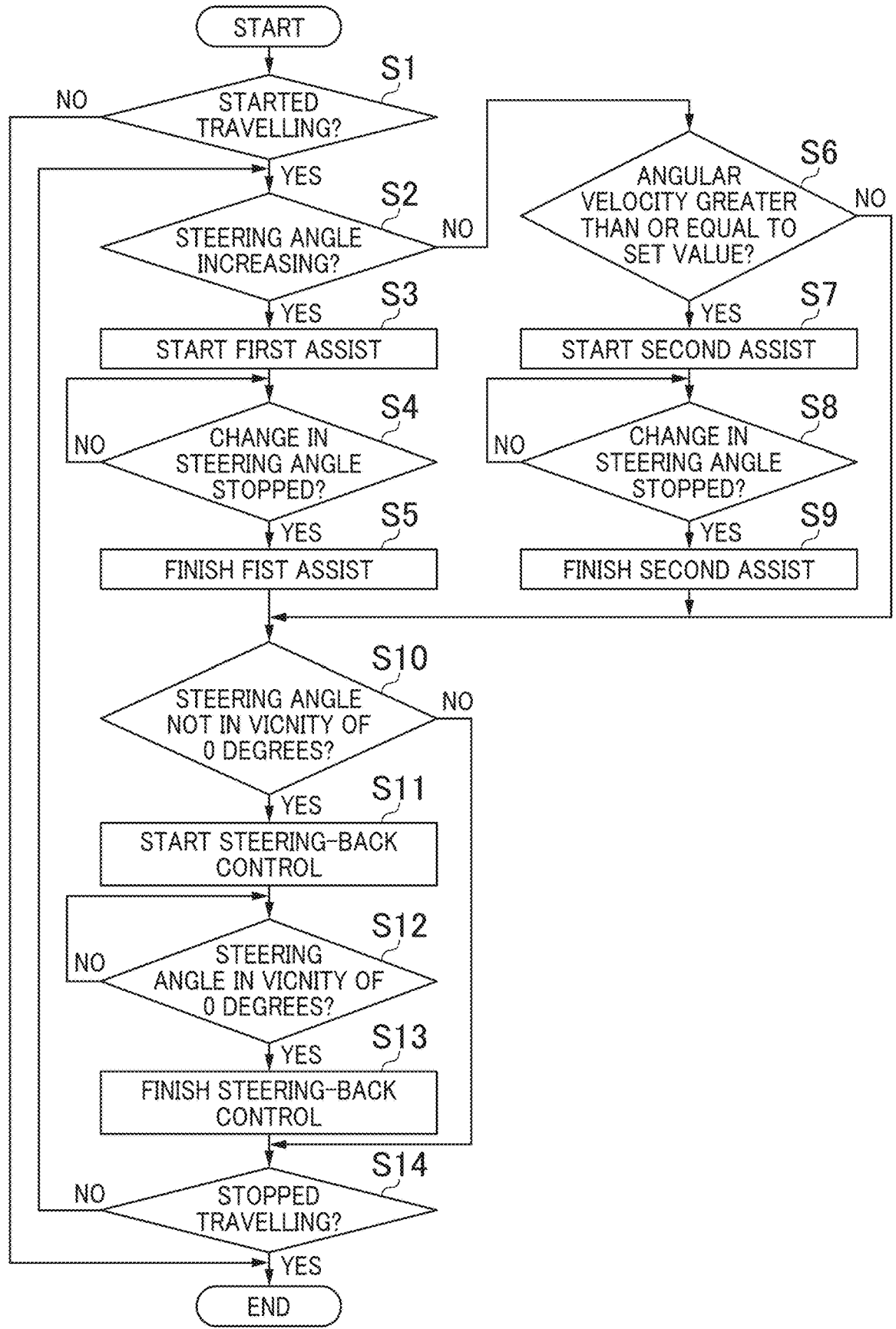
FIG. 5 is a flowchart illustrating control processing performed by a steering assist apparatus according to an embodiment.

Referring to FIG. 5, control processing performed by ECU (steering assist apparatus) 100 will be described. FIG. 5 is a flowchart illustrating control processing performed by ECU (steering assist apparatus) 100.

First, ECU 100 determines whether or not vehicle 1 has started travelling (step S1). In step S1, ECU 100 determines that vehicle 1 has started travelling when, for example, a predetermined sensor detects that motors 21 and 22 are rotating and determines that vehicle 1 is stopped when the predetermined sensor detects that motors 21 and 22 do are not rotating.

When vehicle 1 has not started travelling (NO in step S1), ECU 100 finishes control processing.

When vehicle 1 has started travelling (YES in step S1), ECU 100 (detection section 101) determines whether or not the steering angle of steering wheel 60 is increasing (step S2). Based on rotation angle information from steering-angle sensor 80, ECU 100 (detection section 101) determines that the steering angle is increasing when the steering angle is increasing and determines that that the steering angle is not increasing when the steering angle is decreasing or the steering angle is not changing.

A case where the steering angle is increasing is assumed to be a case where a steering operation of increasing the steering angle is being performed. A case where the steering angle is decreasing is assumed to be a case where a steering operation of decreasing the steering angle is being performed. A case where the steering angle is not changing is assumed to be a case where a steering operation is not being performed.

When the steering angle is increasing (YES in step S2), ECU 100 (assist section 102) starts first assist (step S3).

In step S3, ECU 100 (assist section 102) determines an assist torque, which is a torque amount to be increased or decreased for assist, in accordance with the steering angle. Then, ECU 100 (assist section 102) decreases the travel torque of a motor that drives an inner steerable wheel of vehicle 1 during a turn by the amount of the assist torque and increases the travel torque of a motor that drives an outer steerable wheel during a turn by the amount of the assist torque.

Next, ECU 100 (detection section 101) determines whether or not change in the steering angle has stopped (step S4). Based on rotation angle information from steering-angle sensor 80, ECU 100 (detection section 101) determines that change in the steering angle has stopped when the steering angle is not changing and determines that change in the steering angle has not stopped when the steering angle is changing.

When change in the steering angle has not stopped (NO in step S4), ECU 100 (detection section 101) repeats processing of step S4 until change in the steering angle stops. When change in the steering angle has stopped (YES in step S4), ECU 100 (assist section 102) finishes first assist (step S5). Subsequently, ECU 100 performs processing of step S10.

When the steering angle is not increasing (NO in step S2), ECU 100 determines whether or not the angular velocity of steering wheel 60 is greater than or equal to a set value (step S6). Hereafter, the set value will be described.

In a vehicle in which the caster angle is not 0 degrees, when the steering angle of a steering wheel is not in the vicinity of 0 degrees, a torque is generated in a steerable wheel of the vehicle, and, receiving the torque, the steerable wheel becomes inclined from an orientation when the vehicle is in a turning state to an orientation when the vehicle is in a straightly-moving state. Hereafter, such a torque will be referred to as "self-aligning torque". Moreover, in accordance with the movement of the steerable wheel, the steering angle of the steering wheel becomes closer to 0 degrees. The magnitude of the self-aligning torque increases as the caster angle increases.

In a vehicle in which the caster angle is 0 degrees, the self-aligning torque is not generated, and the steering wheel does not become closer to 0 degrees even when the steering angle is comparatively large. In the present embodiment, an imaginary caster angle is set, and a self-aligning torque that is generated when it is assumed that the caster angle of vehicle 1 is set to the imaginary caster angle is calculated. Then, an angular velocity when steering wheel 60 rotates toward a steering angle of 0 degrees when the self-aligning torque is generated is calculated for each steering angle. The calculated value is set as a set value for each steering angle. In the present embodiment, the imaginary caster angle is set to 2 degrees.

In step S6, ECU 100 determines whether or not the angular velocity of steering wheel 60 is greater than or equal to the set value, based on the steering angle and the angular velocity of steering wheel 60.

When the angular velocity of steering wheel 60 is less than the set value (NO in step S6), ECU 100 performs processing of step S10.

When the angular velocity of steering wheel 60 is greater than or equal to the set value (YES in step S6), ECU 100 (assist section 102) starts second assist (step S7).

A case where the angular velocity of steering wheel 60 is greater than or equal to the set value is assumed, for example, to be a case where an operation of decreasing the steering angle is performed after a driver inclines steering wheel 60 when turning left or a right.

In step S7, ECU 100 (assist section 102) determines an assist torque in accordance with the steering angle. Then, ECU 100 (assist section 102) increases the travel torque of a motor that drives an inner steerable wheel of vehicle 1 during a turn by the amount of the assist torque and decreases the travel torque of a motor that drives an outer steerable wheel during a turn by the amount of the assist torque.

Next, ECU 100 (detection section 101) determines whether or not change in the steering angle has stopped (step S8), and, when change in the steering angle has not stopped (NO in step S8), repeats processing of S8 until change in the steering angle stops. When change in the steering angle has stopped (YES in step S8), ECU 100 (assist section 102) finishes second assist (step S9). Subsequently, ECU 100 performs processing of step S10.

In step S10, ECU 100 (detection section 101) determines whether or not the steering angle is not in the vicinity of 0 degrees, based on rotation angle information from steering-angle sensor 80. Here, the vicinity of 0 degrees means a predetermined angular range in the vicinity of 0 degrees that has been preset, and, for example, the predetermined angular range is set to be greater than or equal to −2 degrees and less than or equal to +2 degrees.

When the steering angle is not in the vicinity of 0 degrees (NO in step S10), ECU 100 performs processing of step S14.

When the steering angle is in the vicinity of 0 degrees (YES in step S10), ECU 100 (assist section 102) starts steering-back control (step S11).

As described above, in a vehicle in which the caster angle is not 0 degrees, when the steering angle of a steering wheel is not in the vicinity of 0 degrees, receiving a self-aligning torque, the steerable wheel of the vehicle becomes inclined from an orientation when the vehicle is in a turning state to an orientation when the vehicle is in a straightly-moving state. Accordingly, the steering angle of a steering wheel becomes closer to 0 degrees.

Steering-back control is control for promoting: movement when the orientation of the steerable wheel changes from an orientation in a turning state to an orientation in a straightly-moving state; and rotation of steering wheel 60 toward a steering angle of 0 degrees.

To be specific, ECU 100 (assist section 102) increases the travel torque of a motor that drives an inner steerable wheel of vehicle 1 during a turn by the amount of a predetermined torque and decreases the travel torque of a motor that drives an outer steerable wheel during a turn by the amount of the predetermined torque. Hereafter, the predetermined torque when performing steering-back control will be referred to as "back-control torque".

The back-control torque is set to a magnitude that is necessary for steering wheel 60 to rotate toward a steering angle of 0 degree with an angular velocity corresponding to the aforementioned set value when an operation or holding of steering wheel 60 is not performed by a driver. Therefore, the back-control torque differs in accordance with the steering angle and increases as the steering angle increases.

When steering-back control is performed, the orientation of steerable wheels 11 and 12 changes from an orientation when vehicle 1 is in a turning state toward an orientation when in a straightly-moving state, and, accordingly, a rotational torque is generated in steering shaft 61 so that steering wheel 60 becomes closer to a steering angle of 0 degrees. Thus, it is possible to provide a driver with a sensation such that vehicle 1 is to move straightly.

Next, ECU 100 (detection section 101) determines whether or not the steering angle is in the vicinity of 0 degrees (step S12). When the steering angle is not in the vicinity of 0 degrees (NO in step S12), steering-back control is continued and processing of step S12 is repeated until the steering angle falls in the vicinity of 0 degrees.

When the steering angle is in the vicinity of 0 degrees (YES in step S12), ECU 100 (assist section 102) finishes steering-back control (step S13).

Subsequently, ECU 100 (detection section 101) determines whether or not vehicle 1 has stopped travelling (step S14). ECU 100 determines that vehicle 1 has stopped travelling when ECU 1 detects that the rotation of motors 21 and 22 has stopped and determines that vehicle 1 is travelling when ECU 1 detects that motors 21 and 22 are rotating.

ECU 100 performs processing of step S2 when vehicle 1 has not stopped travelling (NO in step S14), and ECU 100 finishes control processing when vehicle 1 has stopped travelling (YES in step S14).

When the steering angle increases while steering-back control is being performed, ECU 100 (assist section 102) may finish steering-back control and perform first assist. When the steering angle decreases while steering-back control is being performed and the angular velocity of steering wheel 60 becomes greater than or equal to the set value, ECU 100 may finish steering-back control and perform second assist.

<First and Second Assist>

Hereafter, referring to FIGS. 6 to 9, first and second assist will be described by using a left turn of vehicle 1 as an example.

Figure 6:
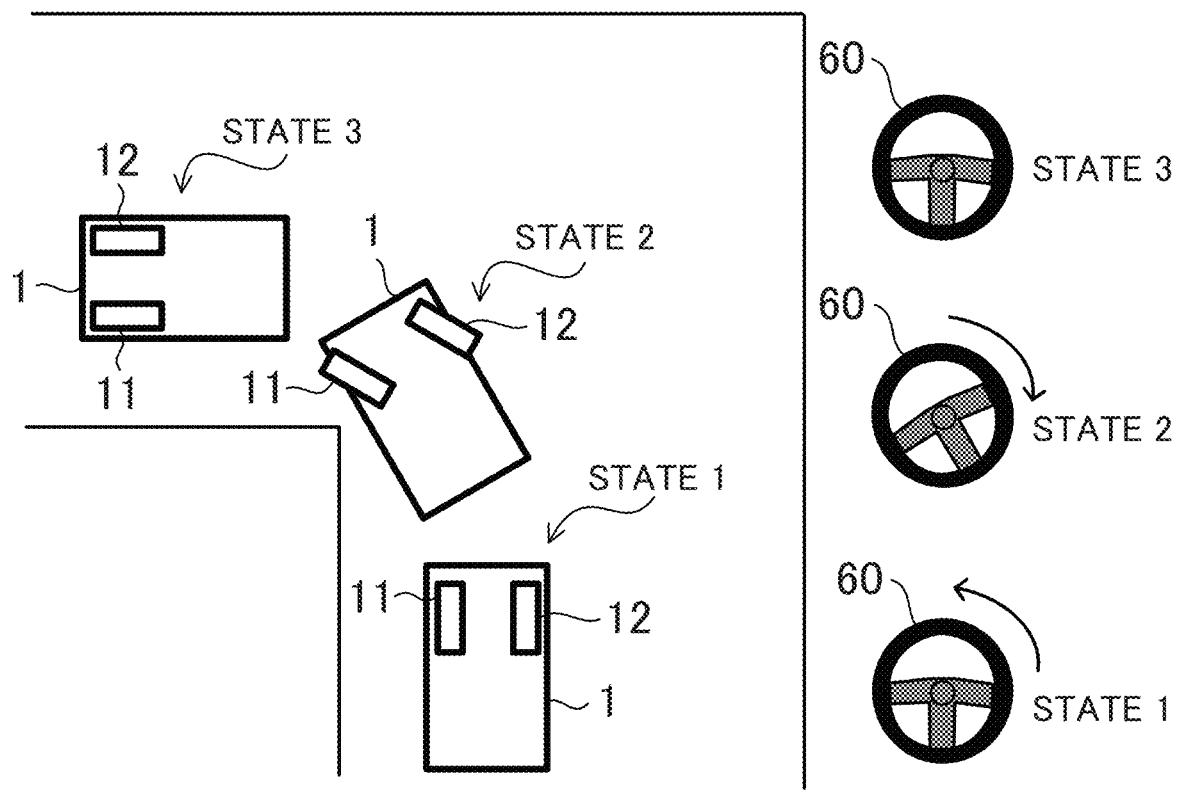
FIG. 6 is a schematic view illustrating a state in which the vehicle according to the embodiment is turning left.
Figure 7:
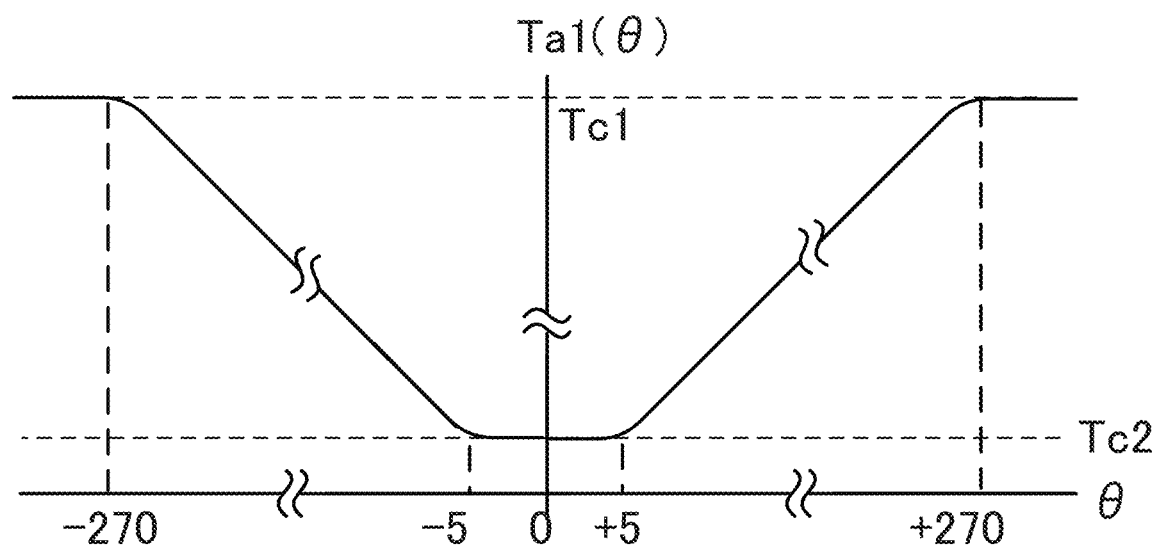
FIG. 7 illustrates the assist amount of the steering assist apparatus according to the embodiment.
Figure 8:
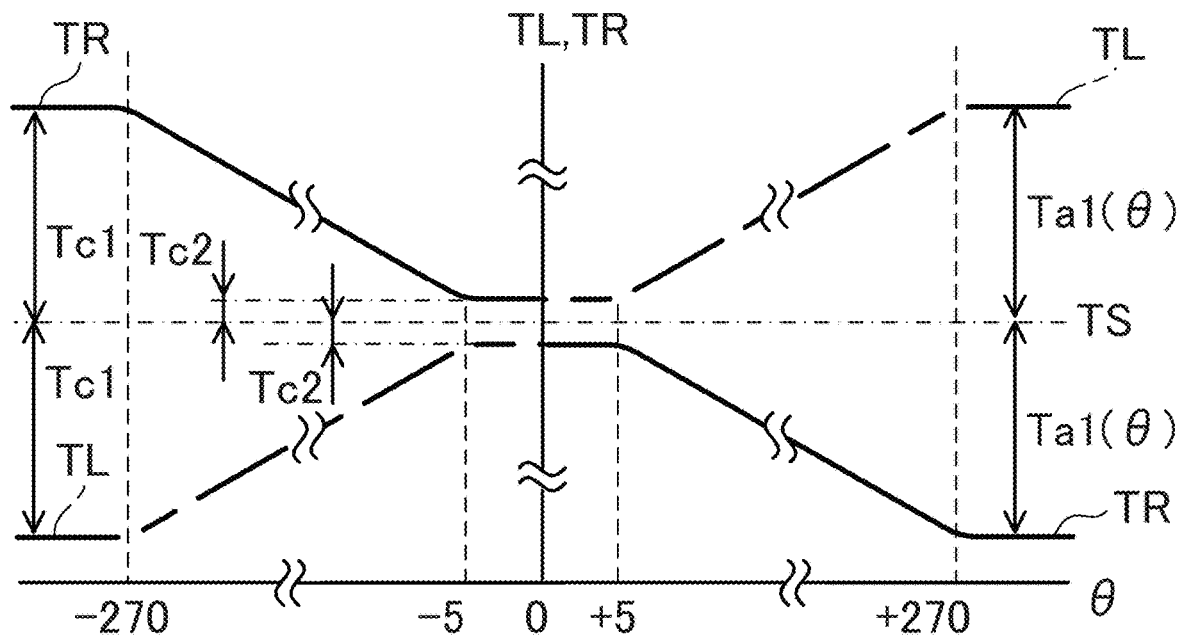
FIG. 8 illustrates the travel torques of left and right motors when the vehicle according to the embodiment makes a transition from a straightly-moving state to a turning state.
Figure 9:
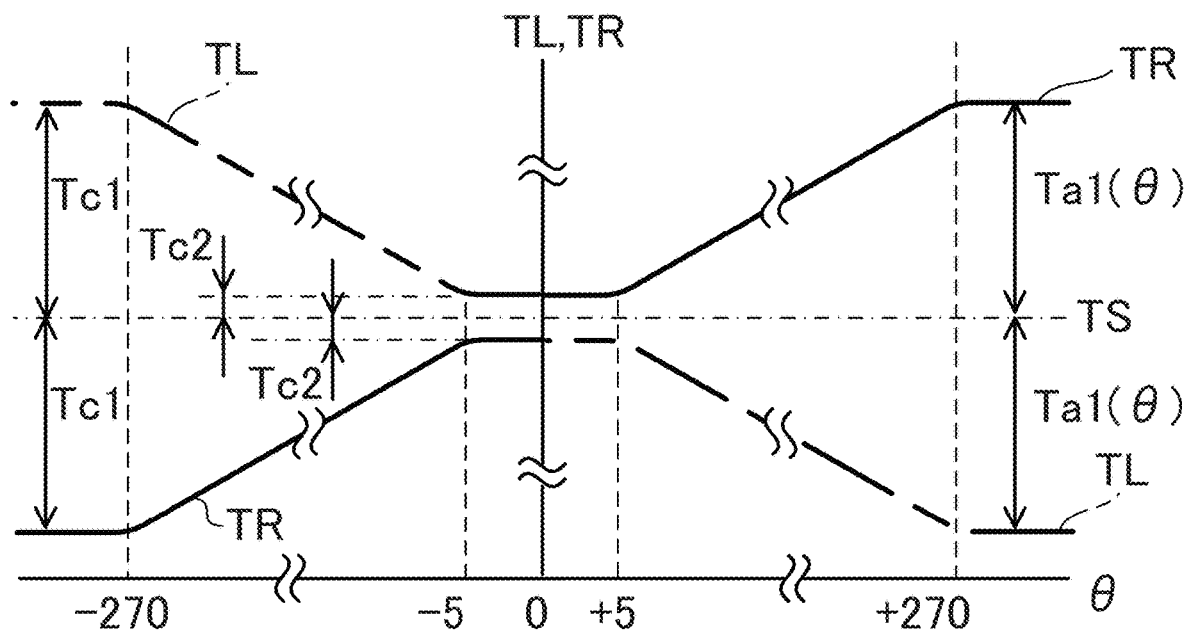
FIG. 9 illustrates the travel torques of the left and right motors when the vehicle according to the embodiment makes a transition from a turning state to a straightly-moving state.

FIG. 6 is a schematic view illustrating a state in which vehicle 1 is turning left. FIG. 7 illustrates the assist amount (assist torque) during steering. FIG. 8 illustrates the travel torques of left and right motors 21 and 22 when vehicle 1 makes a transition from a straightly-moving state to a turning state. TL and TR in FIG. 8 are curves that represent the travel torques of left motor 21 and right motor 22. TS in FIG. 8 is a torque that each of motors 21 and 22 outputs, irrespective of assist processing, to allow vehicle 1 to travel and is determined in accordance with the target travel velocity of vehicle 1. FIG. 9 illustrates the travel torques TL and TR of left and right motors 21 and 22 when vehicle 1 makes a transition from a turning state to a straightly-moving state.

[First Assist]

During travelling, when steering wheel 60 starts rotating from a state of 0 degrees (that is, state 1) in the negative direction, ECU 100 (assist section 102) determines an assist torque Ta1($\theta$) and starts first assist based on the assist torque Ta1($\theta$).

The magnitude of the assist torque Ta1($\theta$) is determined in accordance with the rotation angle $\theta$. As illustrated in FIG. 7, the assist torque Ta1($\theta$) has a predetermined value Tc1 (constant value) when the steering angle |$\theta$| is greater than or equal to a first threshold (for example, 270 degrees). The assist torque Ta1($\theta$) increases as the steering angle |$\theta$| increases when the steering angle |$\theta$| is less than the first threshold and greater than or equal to a second threshold (for example, 5 degrees). Moreover, the assist torque Ta1($\theta$) has a predetermined value Tc2 (constant value) when the steering angle |θ| is less than the second threshold.

The predetermined value Tc1 is a value that is greater than or equal to the maximum value of the assist torque Ta1(θ) when the steering angle |θ| is less than the first threshold and greater than or equal to the second threshold. The predetermined value Tc2 is a very small value that is less than or equal to the minimum value of the assist torque Ta1(θ) when the steering angle |θ| is less than the first threshold and greater than or equal to the second threshold. Although the predetermined value Tc2 in FIG. 7 is the same as the minimum value, the predetermined value Tc2 may be, for example, 0.

ECU 100 (assist section 102) determines the magnitude of the assist torque Ta1(θ) in accordance with the steering angle |θ|. Then, ECU 100 (assist section 102) decreases the travel torque of left motor 21, which drives left steerable wheel 11, by the amount of the assist torque Ta1(θ) and increases the travel torque of right motor 22, which drives right steerable wheel 12, by the amount of the assist torque Ta1(θ).

For example, when steering wheel 60 rotates from a rotation angle of 0 degrees to a rotation angle of −280 degrees, as illustrated in FIG. 8, the travel torque TL of left motor 21 is less than the torque TS by the amount of Tc2 irrespective of the steering angle |θ| until the rotation angle reaches −5 degrees, and gradually decreases in accordance with increase of the steering angle |θ| after the rotation angle has reached −5 degrees. Then, after the rotation angle has reached 270 degrees, the travel torque TL is less than the torque TS by the amount of Tc1 irrespective of the steering angle |θ|.

On the other hand, the travel torque TR of right motor 22 is greater than the torque TS by the amount of Tc2 irrespective of the steering angle |θ| until the rotation angle reaches −5 degrees, and gradually increases in accordance with increase of the steering angle |θ| after the rotation angle has reached −5 degrees. Then, after the rotation angle has reached 270 degrees, the travel torque TR is greater than the torque TS by the amount of Tc1 irrespective of the steering angle |θ|.

Due to such first assist, vehicle 1 smoothly makes a transition from a straightly-moving state (state 1) to a left-turning state (state 2) (see FIG. 6).

[Second Assist]

When steering wheel 60 starts rotating from a state of being inclined in the negative direction (state 2 in FIG. 6) in a direction such that the rotation angle returns to 0 degrees, ECU 100 (assist section 102) determines the assist torque Ta1(θ) and starts second assist based on the assist torque Ta1(θ).

In the same way as in first assist, ECU 100 (assist section 102) determines the magnitude of the assist torque Ta1(θ) in accordance with the steering angle |θ|. Then, ECU 100 (assist section 102) increases the travel torque of left motor 21, which drives left steerable wheel 11, by the amount of the assist torque Ta1(θ) and decreases the travel torque of right motor 22, which drives right steerable wheel 12, by the amount of the assist torque Ta1(θ).

For example, when steering wheel 60 rotates from a rotation angle of −280 degrees to a rotation angle of 0 degrees, as illustrated in FIG. 9, the travel torque TL of left motor 21 is greater than the torque TS by the amount of Tc1 irrespective of the steering angle |θ| until the rotation angle becomes less than −270 degrees, and gradually decreases in accordance with decrease of the steering angle |θ| after the rotation angle has become less than −270 degrees. Then, after the rotation angle has become less than −5 degrees, the travel torque TL is greater than the torque TS by the amount of Tc2 irrespective of the steering angle |θ|.

On the other hand, the travel torque TR of right motor 22 is less than the torque TS by the amount of Tc1 irrespective of the steering angle |θ| until the rotation angle becomes less than −270 degrees, and gradually increases in accordance with decrease of the steering angle |θ| after the rotation angle has become less than −270 degrees. Then, after the rotation angle has become less than −5 degrees, the travel torque TR is less than the torque TS by the amount of Tc2 irrespective of the steering angle |θ|.

Due to such first assist, vehicle 1 smoothly makes a transition from a left-turning state (state 2) to a straightly-moving state (state 3).

When vehicle 1 turns right, the travel torques TL and TR of left and right motors 21 and 22 change along the curves in regions of FIGS. 8 and 9 in which the rotation angle is positive.

When finishing first and second assist, ECU 100 (assist section 102) returns the travel torques of motors 21 and 22 to TS.

As heretofore described, while the steering angle is increasing, in a range in which the steering angle is in less than the second threshold, the steering assist apparatus according to the present embodiment causes the assist torque to have a very small value, decreases the travel torque of a motor that drives the inner steerable wheel of vehicle 1 during a turn by the amount of the assist torque, and increases the travel torque of a motor that drives the outer steerable wheel of vehicle 1 during a turn by the amount of the assist torque. By making the assist amount small in a range in which the steering angle is small in this way, a state in which steering is not easy is maintained. Thus, it is possible to increase the straight-line stability of vehicle 1 and to provide a driver with a sensation such that vehicle 1 is to move straightly.

On the other hand, in a range in which the steering angle is greater than or equal to the second threshold, the steering assist apparatus increases the assist torque as the steering angle increases. By increasing the assist amount as the steering angle increases in a range in which the steering angle is large in this way, it is possible decrease a force necessary for steering when a driver turns left or light. That is, it is possible for the driver to perform a steering operation with a small force.

Accordingly, it is possible to decrease a force necessary for steering while maintaining the straight-line stability of vehicle 1.

Moreover, while the steering angle is decreasing, the steering assist apparatus increases the travel torque of a motor that drives the inner steerable wheel of vehicle 1 during a turn by the amount of the assist torque and decreases the travel torque of a motor that drives the outer steerable wheel of vehicle 1 during a turn by the amount of the assist torque. Thus, since steerable wheels 11 and 12 can easily take a direction for moving straightly from a state of being inclined, it is possible to increase the straight-line stability of vehicle 1. Moreover, since steering wheel 60 rotates naturally so that the rotation angle becomes closer to 0 degrees, it is possible to further provide a driver with a sensation such that vehicle 1 is to move straightly.

Since the assist torque does not depend on the steering angle and has a constant value when the steering angle is greater than or equal to the first threshold, an upper limit value is set on the difference between the travel torques TL and TR of left and right motors 21 and 22. Thus, it is possible to safely assist in steering of vehicle 1.

Vehicle 1 may be a vehicle whose left and right front wheels and the left and right rear wheels are all steerable wheels and that includes a plurality of motors that drive the steerable wheels independently. In this case, during first assist, ECU 100 (assist section 102) decreases the travel torques of motors that drive an inner front wheel and an inner rear wheel during a turn by the amount of the assist torque Ta1(θ) and increases the travel torques of motors that drive an outer front wheel and an outer rear wheel during a turn by the amount of the assist torque Ta1(θ). Moreover, during second assist, ECU 100 (assist section 102) increases the travel torques of motors that drive an inner front wheel and an inner rear wheel during a turn by the amount of the assist torque Ta1(θ) and decreases the travel torques of motors that drive an outer front wheel and an outer rear wheel during a turn by the amount of the assist torque Ta1(θ).

(Variation)

Hereafter, regarding a variation, mainly the differences from the embodiment described above will be described.

ECU 100 (assist section 102) according to the variation performs first assist in consideration of not only the steering angle |θ| but also the angular velocity of steering wheel 60. To be specific, ECU 100 (assist section 102) increases or decreases the travel torques of left and right motors 21 and 22 based on an assist torque Ta2(θ, ω).

The assist torque Ta2(θ, ω) is represented as k(ω)Ta1(θ), which is the product of the assist torque Ta1(θ) in the embodiment described above and a coefficient k(ω). k(ω) is determined in accordance with the angular velocity (that is, the time-derivative of rotation angle) ω of steering wheel 60.

Figure 10:
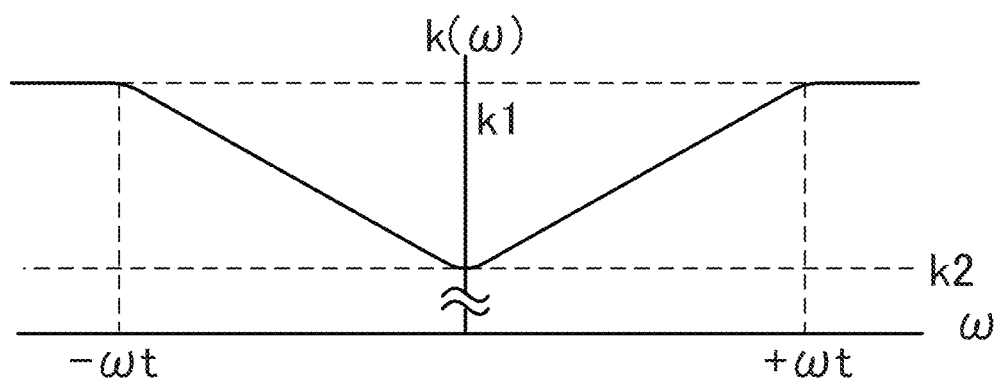
FIG. 10 illustrates the coefficient of the assist amount of a steering assist apparatus according to a variation.

FIG. 10 illustrates the coefficient k(ω) of the assist torque Ta2(θ, ω) of ECU 100 (assist section 102) according to the variation.

The coefficient k(ω) increases as the absolute value |ω| of angular velocity increases, and, when the absolute value |ω| of angular velocity is greater than or equal to a third threshold |ω|, has a maximum value k1 (for example, k1=1.2) irrespective of the absolute value |ω| of angular velocity. When the absolute value |ω| of angular velocity is 0, the coefficient k(ω) has a minimum value k2 (for example, 1).

In the present variation, the predetermined value Tc2, the coefficient k(ω), the maximum value k1, and the minimum value k2 are set to that the value of the assist torque Ta2(θ, ω) when the steering angle |θ| is less than the second threshold is less than or equal to the minimum value of the assist torque Ta2(θ, ω) when the steering angle |θ| is greater than or equal to the second threshold.

In the same way as in the embodiment described above, ECU 100 (assist section 102) performs second assist based on the assist torque Ta1(θ) in which angular velocity ω is not reflected.

With the present variation, since the assist torque is changed also in consideration of the angular velocity of steering wheel 60 while the rotation angle increases, it is possible to assist in steering of vehicle 1 while appropriately reflecting a steering operation by a driver when turning left or right.

ECU 100 (assist section 102) may perform second assist based on the assist torque Ta2(θ, ω) while the rotation angle decreases.

(Other Variations)

The assist torque Ta1(θ) need not have a constant value when the steering angle is less than the second threshold, and, at least, it is sufficient that the assist torque Ta1(θ) have a value less than or equal to the minimum value of the assist torque Ta1(θ) when the steering angle is greater or equal to the first threshold. Accordingly, when the steering angle is less than the second threshold, the assist torque Ta1(θ) may vary in a range of less than or equal to the minimum value.

When assist processing is performed based on the assist torque Ta2(θ, ω), when steering wheel 60 is rotated with a large angular velocity and until the steering angle becomes greater than or equal to the first threshold, the value of the assist torque Ta2(θ, ω) may become extremely large. Then, an upper limit value may be set on the assist torque Ta2(θ, ω). Thus, it is possible to assist in steering of vehicle 1 more safely.

Steering apparatus 70 described above may be a ball-nut steering apparatus or a steering apparatus based on a by-wire system.

In the embodiment and the variations described above, it has been described that vehicle 1 is an in-wheel-motor vehicle in which the kingpin angle is set to 0 degrees and the caster angle is set to 0 degrees when unloaded. However, the steering assist apparatus according to the present disclosure is applicable to any vehicle including a plurality of motors that independently perform travel drive of at least left and right two steerable wheels. That is, the steering assist apparatus according to the present disclosure is also applicable to a vehicle other than an in-wheel-motor vehicle.

Moreover, the steering assist apparatus according to the present disclosure is more preferably applicable to a vehicle in which the kingpin offset R is not 0 and the absolute value of caster angle is less than 2 degrees.

The embodiment and the variations described above are only examples in carrying out the present disclosure, and the technical scope of the present disclosure should not be interpreted to be limited by these. That is, the present disclosure can be carried out in various forms within the gist thereof or the main features thereof.

The present application is based on Japanese Patent Application No. 2021-180249, filed Nov. 4, 2021, the entire contents of which are incorporated herein.

INDUSTRIAL APPLICABILITY

A steering assist apparatus, a steering assist method, and a vehicle according to the present disclosure, each of which can decrease a force necessary for steering while maintaining the straight-line stability of a vehicle, has wide industrial applicability.

REFERENCE SIGNS LIST

1 vehicle
11, 12, 212 steerable wheel
21, 22 motor
23, 24 inverter
31, 32, 232 knuckle
41, 42 tie rod
60 steering wheel
61 steering shaft
62 pinion component
63 rack shaft
70 steering apparatus
80 steering-angle sensor
100 ECU (steering assist apparatus)
101 detection section
102 assist section

The invention claimed is:

1. A steering assist apparatus for assisting in steering of a vehicle having a kingpin offset, the apparatus comprising:

a detection section that detects a steering angle of a steering wheel; and an assist section that changes a travel torque based on an assist torque that, when the steering angle is greater than or equal to a threshold, increases as the steering angle increases and that, when the steering angle is less than the threshold, has a value less than or equal to a minimum value when the steering angle is greater than or equal to the threshold, wherein, while the steering angle is increasing, the assist section decreases the travel torque of a first motor that drives an inner steerable wheel of the vehicle during a turn by an amount of the assist torque, and increases the travel torque of a second motor that drives an outer steerable wheel of the vehicle during a turn by the amount of the assist torque.

2. The steering assist apparatus according to claim 1,
wherein, while the steering angle is decreasing, the assist section increases the travel torque of the first motor by the amount of the assist torque and decreases the travel torque of the second motor by the amount of the assist torque.

3. The steering assist apparatus according to claim 1,
wherein the detection section detects an angular velocity of the steering wheel, and
wherein the assist section increases the assist torque as the angular velocity increases.

4. A steering assist method for assisting in steering of a vehicle having a kingpin offset, the method comprising:
detecting a steering angle of a steering wheel; and
while the steering angle is increasing, based on an assist torque, decreasing a travel torque of a first motor that drives an inner steerable wheel of the vehicle during a turn by an amount of the assist torque and increasing a travel torque of a second motor that drives an outer steerable wheel of the vehicle during a turn by the amount of the assist torque, the assist torque being an assist torque that, when the steering angle is greater than or equal to a threshold, increases as the steering angle increases, and that, when the steering angle is less than the threshold, has a value less than or equal to a minimum value when the steering angle is greater than or equal to the threshold.

5. A vehicle comprising the steering assist apparatus according to claim 1.

\* \* \* \* \*